United States Patent
Hanmura et al.

(10) Patent No.: US 9,809,676 B2
(45) Date of Patent: Nov. 7, 2017

(54) AUTOMOTIVE INJECTION-MOLDED PRODUCT

(71) Applicant: YAZAKI CORPORATION, Minato-ku, Tokyo (JP)

(72) Inventors: Kaoru Hanmura, Shizuoka (JP); Shinobu Kayama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/689,163

(22) Filed: Apr. 17, 2015

(65) Prior Publication Data

US 2015/0218307 A1    Aug. 6, 2015

Related U.S. Application Data

(63) Continuation of application No. PCT/JP2013/078348, filed on Oct. 18, 2013.

(30) Foreign Application Priority Data

Oct. 23, 2012 (JP) .................. 2012-234219

(51) Int. Cl.
| | |
|---|---|
| C08G 63/127 | (2006.01) |
| B29C 45/16 | (2006.01) |
| B29C 45/20 | (2006.01) |
| C08J 5/00 | (2006.01) |
| B29C 45/30 | (2006.01) |
| B29K 67/00 | (2006.01) |

(52) U.S. Cl.
CPC ............ C08G 63/127 (2013.01); B29C 45/16 (2013.01); B29C 45/20 (2013.01); B29C 2045/308 (2013.01); B29K 2067/003 (2013.01)

(58) Field of Classification Search
CPC . B29C 45/20; B29C 2045/1698; B29C 45/16; B29K 2067/003; B29K 2067/006; C08G 63/127
USPC ........................................................ 528/308.6
See application file for complete search history.

(56) References Cited

U.S. PATENT DOCUMENTS 8,513,344 B2 * 8/2013 Asano .................. C08J 3/12
523/200

FOREIGN PATENT DOCUMENTS

| | | |
|---|---|---|
| CN | 101716812 A | 6/2010 |
| JP | S53-090063 U | 7/1978 |
| JP | S53-036182 A | 9/1978 |
| JP | S57-089935 A | 6/1982 |
| JP | S59-204520 A | 11/1984 |
| JP | S63-122513 A | 5/1988 |
| JP | H02-092604 A | 4/1990 |

(Continued)

OTHER PUBLICATIONS

Online translation of Detailed Description of JP 10-006364A; publication date: Jan. 1998.*

(Continued)

*Primary Examiner* — Fred M Teskin
(74) *Attorney, Agent, or Firm* — Metrolexis Law Group, PLLC

(57) ABSTRACT

An automotive injection-molded product includes natural pellets and masterbatches that color the natural pellets. In the automotive injection-molded product, a color difference between a high concentration portion and a low concentration portion of the masterbatches with respect to the natural pellets in a flat plate is not more than 6.5.

16 Claims, 13 Drawing Sheets

(56) References Cited

FOREIGN PATENT DOCUMENTS

| JP | H10-006364 A | 1/1998 |
| JP | 2000-198859 A | 7/2000 |
| JP | 2001-150474 A | 6/2001 |
| JP | 2005-178146 A | 7/2005 |
| JP | 2006-159609 A | 6/2006 |

OTHER PUBLICATIONS

Chinese Official Action dated Sep. 8, 2016 in the counterpart Chinese patent application.
Chinese Official Action dated Mar. 20, 2017 in the counterpart Chinese patent application.
Zhang Jiamin et al., Technique of Molding Plastics and Typical Technology Instance, Jul. 31, 2010, pp. 125-126, Chemical industry publishing house, China.
The Chinese office action dated Feb. 26, 2016 in the counterpart Chinese patent application.
Chinese Office action dated Jul. 6, 2017 in the counterpart Chinese patent application.
The Official Action dated May 30, 2017 in the counterpart Japanese patent application.

\* cited by examiner

FIG. 3

|  | ELEMENT | | LAND LENGTH L2+L3(mm) | INJECTION PRESSURE (MPa) | | |
|---|---|---|---|---|---|---|
|  | ELEMENT DIAMETER D1(mm) | ELEMENT LENGTH L1(mm) |  | INJECTION SPEED (mm/sec) | | |
|  |  |  |  | 20 | 50 | 80 |
| COMPARATIVE EXAMPLE 1 | 16 | 15.5 | 50 | 16.5 | 30.5 | 38.9 |
| EXAMPLE 1 | 19 | 10.0 | 25 | 10.2 | 18.9 | 23.2 |
| EXAMPLE 2 | 19 | 10.0 | 30 | 12.0 | 20.2 | 25.0 |
| EXAMPLE 3 | 19 | 30.0 | 25 | 11.8 | 20.1 | 24.9 |
| EXAMPLE 4 | 20 | 10.0 | 25 | 12.0 | 20.4 | 25.3 |
| COMPARATIVE EXAMPLE 2 | - | - | 95 | 11.5 | 19.0 | 23.4 |

FIG. 6

| | ELEMENT DIAMETER D1(mm) | ELEMENT HOLE DIAMETER D3(mm) | ELEMENT LENGTH L1(mm) | L1/D3 | INJECTION PRESSURE PER ONE ELEMENT (MPa) |
|---|---|---|---|---|---|
| COMPARATIVE EXAMPLE 1 | 16.5 | 8 | 16 | 2.00 | 3.40 |
| COMPARATIVE EXAMPLE 2 | 18.5 | 9 | 16 | 1.78 | 3.00 |
| EXAMPLE 1 | 20.5 | 10 | 16 | 1.60 | 2.70 |
| EXAMPLE 2 | 22.5 | 11 | 16 | 1.45 | 2.50 |
| EXAMPLE 3 | 24.5 | 12 | 16 | 1.33 | 2.30 |
| EXAMPLE 4 | 26.5 | 13 | 16 | 1.23 | 2.10 |
| EXAMPLE 5 | 30 | 14.5 | 16 | 1.10 | 1.60 |
| EXAMPLE 6 | 30.5 | 15 | 16 | 1.07 | 1.50 |
| EXAMPLE 7 | 40.5 | 20 | 16 | 0.80 | 1.20 |
| EXAMPLE 8 | 50.5 | 25 | 16 | 0.64 | 0.90 |
| COMPARATIVE EXAMPLE 3 | 70.5 | 35 | 16 | 0.46 | 0.70 |

FLOW PASSAGE DIAMETER d

| | NUMBER OF ELEMENT HOLES | FLOW PASSAGE CROSS-SECTIONAL AREA (mm²) | DIVISION NUMBER (TIMES) | INJECTION PRESSURE (MPa) | | |
|---|---|---|---|---|---|---|
| | | | | INJECTION SPEED (mm/sec) | | |
| | | | | 20 | 50 | 80 |
| COMPARATIVE EXAMPLE 1 | 2 | 100.5 | 4096 | 16.5 | 30.5 | 38.9 |
| EXAMPLE 1 | 3 | 128.7 | 46656 | 13.0 | 24.1 | 30.7 |
| EXAMPLE 2 | 4 | 134.4 | 262144 | 12.3 | 22.8 | 29.1 |
| EXAMPLE 3 | 5 | 131.8 | 1000000 | 12.7 | 23.5 | 30.0 |
| EXAMPLE 4 | 6 | 125.8 | 2985984 | 13.3 | 24.9 | 31.4 |
| EXAMPLE 5 | 7 | 118.6 | 7529536 | 14.1 | 26.1 | 33.3 |
| EXAMPLE 6 | 8 | 111.1 | 16777216 | 15.1 | 27.9 | 35.6 |
| EXAMPLE 7 | 9 | 103.8 | 34012224 | 16.1 | 29.8 | 38.0 |
| COMPARATIVE EXAMPLE 2 | 10 | 96.9 | 64000000 | 17.3 | 31.9 | 40.7 |
| COMPARATIVE EXAMPLE 3 | - | 50.2 | - | 11.5 | 19.0 | 23.4 |

FIG. 12

| | | PRESSURE LOSS PER ONE ELEMENT (MPa) | | | | | | | | | | | | | | |
|---|---|---|---|---|---|---|---|---|---|---|---|---|---|---|---|---|
| | | ELEMENT (mm) | | | | | | | | | | | | | | |
| | | 10 | | | 16 | | | 20 | | | 30 | | | 40 | | |
| INJECTION SPEED (mm/sec) | | 20 | 50 | 80 | 20 | 50 | 80 | 20 | 50 | 80 | 20 | 50 | 80 | 20 | 50 | 80 |
| | 5 | 0.64 | 1.30 | 1.87 | 0.11 | 0.23 | 0.34 | 0.05 | 0.10 | 0.15 | 0.01 | 0.02 | 0.04 | 0.00 | 0.01 | 0.01 |
| | 10 | 1.27 | 2.59 | 3.73 | 0.23 | 0.47 | 0.67 | 0.10 | 0.21 | 0.30 | 0.02 | 0.05 | 0.07 | 0.01 | 0.02 | 0.03 |
| | 15.5 | 1.97 | 4.02 | 5.79 | 0.35 | 0.72 | 1.05 | 0.16 | 0.32 | 0.47 | 0.04 | 0.07 | 0.11 | 0.01 | 0.03 | 0.04 |
| | 20 | 2.55 | 5.18 | 7.47 | 0.46 | 0.93 | 1.35 | 0.20 | 0.42 | 0.60 | 0.05 | 0.10 | 0.14 | 0.02 | 0.03 | 0.05 |
| ELEMENT LENGTH (mm) | | | | | | | | | | | | | | | | |

FIG. 13

| LAND LENGTH (mm) | PRESSURE LOSS PER ONE ELEMENT (MPa) | | |
| --- | --- | --- | --- |
| | INJECTION SPEED (mm/sec) | | |
| | 20 | 50 | 80 |
| 45 | 5.41 | 8.80 | 11.30 |
| 40 | 4.81 | 7.83 | 10.05 |
| 35 | 4.21 | 6.85 | 8.79 |
| 30 | 3.61 | 5.87 | 7.53 |
| 25 | 3.01 | 4.89 | 6.28 |
| 20 | 2.41 | 3.91 | 5.02 |
| 15 | 1.80 | 2.93 | 3.77 |
| 10 | 1.20 | 1.96 | 2.51 |

FIG. 14

|  |  | COMPARATIVE EXAMPLE 1 | EXAMPLE | COMPARATIVE EXAMPLE 2 | COMPARATIVE EXAMPLE 3 |
|---|---|---|---|---|---|
| TENSILE TEST | TENSILE BREAKING ELONGATION (%) | 240 | 235 | 200 | 110 |
|  | MAXIMUM STRENGTH (MPa) | 48 | 48 | 50 | 53 |
| Izod IMPACT STRENGTH (J/m) | | 43.5 | 43 | 35 | 28 |
| COLOR DIFFERENCE | | 0 | 3 | 7 | 18 |

| | | DETERMI-NATION CRITERIA | EXAMPLE | COM-PARATIVE EXAMPLE 2 | COM-PARATIVE EXAMPLE 3 |
|---|---|---|---|---|---|
| TENSILE TEST | TENSILE BREAKING ELONGATION | 40% OR MORE | ○ | × | × |
| | MAXIMUM STRENGTH | 45 MPa OR MORE | ○ | ○ | ○ |
| Izod IMPACT STRENGTH | | 24.5 J/m OR MORE | ○ | × | × |
| COLOR DIFFERENCE | | 6.5 OR LESS | ○ | × | × |

AUTOMOTIVE INJECTION-MOLDED PRODUCT

CROSS REFERENCE TO RELATED APPLICATION

This application is a Continuation of PCT Application No. PCT/JP2013/078348, filed on Oct. 18, 2013, and claims the priority of Japanese Patent Application No. 2012-234219, filed on Oct. 23, 2012, the content of both of which is incorporated herein by reference.

BACKGROUND

1. Technical Field

The present invention relates to an automotive injection-molded product molded using an injection molding nozzle.

2. Related Art

Japanese Examined Patent Application Publication No. 53-36182 proposes an injection molding nozzle used for kneading a material of an injection-molded product. The injection molding nozzle includes a nozzle body and a plurality of fluid mixing components. The nozzle body has a cylindrical shape, and has at its one end an inlet port through which a material is introduced and at its other end an outlet port through which the introduced material is delivered. The plurality of fluid mixing components is arranged between the inlet port and the outlet port of the nozzle body, and used for kneading a material which is introduced into the nozzle body through the inlet port by introducing the material through a plurality of fluid passages.

In an injection-molded product molded using the above injection molding nozzle, natural pellets and masterbatches that color the natural pellets are introduced through the inlet port by an injection molding machine to flow through the plurality of fluid mixing components, and, thus, to be kneaded. The kneaded natural pellets and masterbatches are injected into a mold member through the outlet port, whereby injection molding is performed.

By virtue of the use of an injection molding nozzle having elements like the plurality of fluid mixing components, it is possible to obtain an injection-molded product with less color unevenness as compared with the case of using an open nozzle without a plurality of elements.

SUMMARY

In an injection-molded product molded using the injection molding nozzle as described, a color difference between a high concentration portion and a low concentration portion of masterbatches with respect to natural pellets in a flat plate is more than 6.5. In such an injection-molded product whose color difference is more than 6.5, color unevenness may become accidentally noticeable.

An object of the present invention is to provide an automotive injection-molded product where color unevenness is hardly noticeable.

An automotive injection-molded product in accordance with some embodiments of the present invention includes natural pellets and masterbatches that color the natural pellets. A color difference between a high concentration portion and a low concentration portion of the masterbatches with respect to the natural pellets in a flat plate is not more than 6.5.

According to the above constitution, in the automotive injection-molded product, the color difference between the high concentration portion and the low concentration portion with respect to the natural pellets in the flat plate is not more than 6.5, and therefore color unevenness is unnoticeable.

The automotive injection-molded product may have a material physical property equivalent to a material physical property of colored pellets.

According to the above constitution, the automotive injection-molded product has a material physical property substantially equivalent to that of colored pellets. Thus, the color unevenness is unnoticeable, and the material physical property is not lowered.

The present inventor developed an injection molding nozzle which can achieve an injection pressure substantially equivalent to that of an open nozzle. The above-described automotive injection-molded product is molded using the injection molding nozzle.

According to the above constitution, an automotive injection-molded product where color unevenness is hardly noticeable can be provided.

BRIEF DESCRIPTION OF DRAWINGS

FIG. 3 is a graph showing injection pressures in Examples and Comparative Examples in the injection molding nozzle according to the first study example.

FIG. 6 is a graph showing the injection pressures per one element in Examples and Comparative Examples in the injection molding nozzle according to the second study example.

FIG. 12 is a graph of a reference example showing a change in a pressure loss per one element depending on changes in the element length and the element diameter.

FIG. 13 is a graph of a reference example showing a change in the pressure loss per one element depending on a change in a land length.

FIG. 14 is a graph showing measurement results of Examples and Comparative Examples when a resin of another example is used in natural pellets of an automotive injection-molded product according to an embodiment of the present invention.

DETAILED DESCRIPTION

Figure 1:
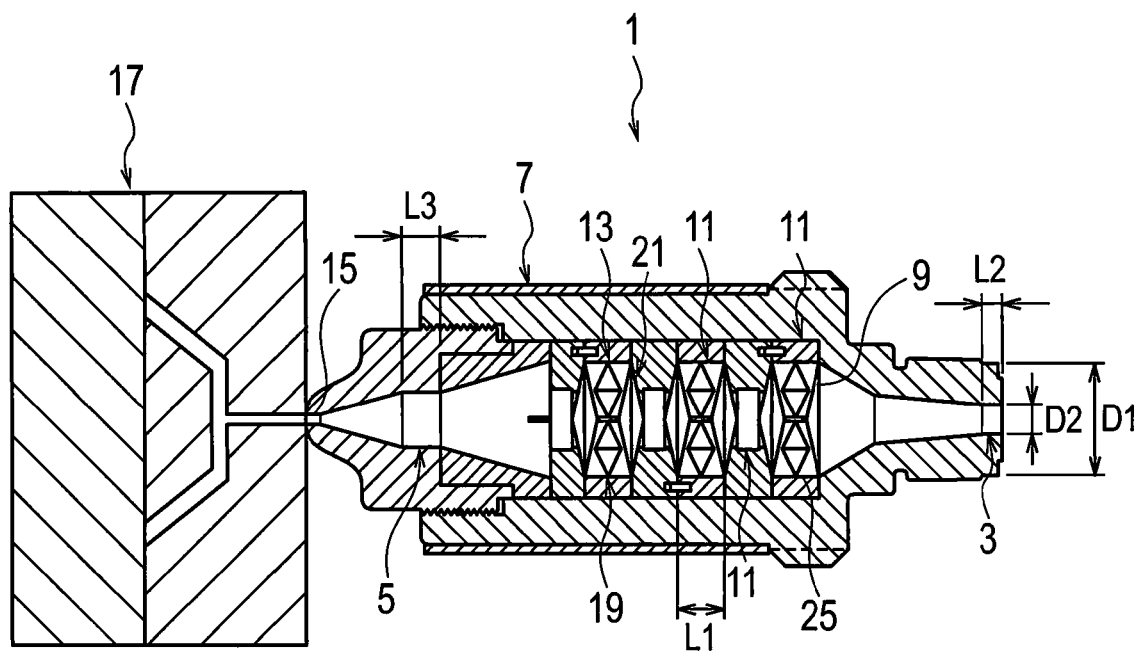
FIG. 1 is a cross-sectional view of an injection molding nozzle according to a first study example.

First, study examples of an injection molding nozzle used for molding an automotive injection-molded product according to an embodiment of the present invention will be described using FIGS. 1 to 13.
First Study Example The first study example will be described using FIGS. 1 to 3.

The injection molding nozzle 1 according to the first study example includes a nozzle body 7 and a plurality of elements 11. The nozzle body 7 has a cylindrical shape, and has at its one end an inlet port 3 through which a fluid is introduced and at its other end an outlet port 5 through which the introduced fluid is delivered. The plurality of elements 11 is arranged between the inlet port 3 and the outlet port 5 of the nozzle body 7, and used for kneading the fluid which is introduced into the nozzle body 7 through the inlet port 3 by introducing the fluid through a plurality of element holes 9.

The nozzle body 7 includes a pressure rise suppression part 13 which suppresses a rise of the injection pressure of the fluid introduced through the inlet port 3.

In this study example, in the pressure rise suppression part 13, the number of the element holes 9 is set to two.

The pressure rise suppression part 13 makes the injection pressure of a fluid, introduced through the inlet port 3 to pass through the plurality of elements 11, and, thus, to flow through the outlet port 5, substantially equivalent to the injection pressure of a fluid introduced through the inlet port 3 and directly flowing through the outlet port 5, that is, a fluid flowing through an open nozzle.

Figure 2:
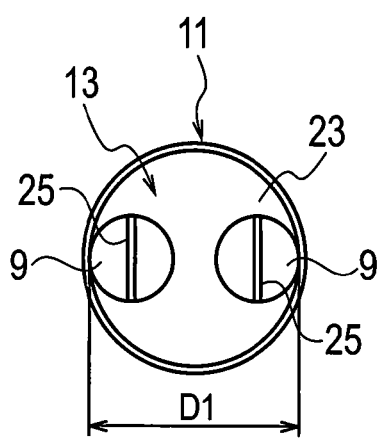
FIG. 2 is a front view of an element of the injection molding nozzle according to the first study example.

As shown in FIGS. 1 and 2, the nozzle body 7 has a cylindrical shape and includes the inlet port 3 and the outlet port 5. The inlet port 3 is provided at one end of the nozzle body 7 and opens on the exterior side of the nozzle body 7 so as to communicate the outside and the inside of the nozzle body 7. On the inlet port 3 side, an injection molding machine (not shown) which injects a heated and melted molding resin material as a fluid is disposed. The molding resin material injected from the injection molding machine is introduced into the nozzle body 7 through the inlet port 3 at a predetermined injection pressure and then delivered through the outlet port 5. A flow passage extending from the inlet port 3 toward the inside of the nozzle body 7 has a tapered shape so that the diameter is expanded toward the inside of the nozzle body 7 and reduces a pressure loss of the molding resin material introduced through the inlet port 3.

The outlet port 5 is provided at the other end of the nozzle body 7 and communicates the inside and the outside of the nozzle body 7. On the outlet port 5 side, a nozzle tip 15 is assembled, and the molding resin material is injected into a mold 17 through the nozzle tip 15. The pressure loss of the molding resin material is further reduced by reducing the length of a distal end on the mold 17 side of the nozzle tip 15.

The molding resin material introduced through the inlet port 3 and then delivered through the outlet port 5 is sometimes colored by being mixed with other coloring materials. In such a case, in an open nozzle in which nothing is provided between the inlet port 3 and the outlet port 5 of the nozzle body 7, appearance failures such as color unevenness may occur. Thus, the plurality of elements 11 used for kneading melted molding resin materials is arranged between the inlet port 3 and the outlet port 5 of the nozzle body 7.

The plurality of (six in this case) elements 11 is arranged in parallel between the inlet port 3 and the outlet port 5 and each include a diverging part 19 and a mixing part 21. The diverging part 19 is constituted of the plurality of element holes 9 communicated from the inlet port 3 side to the outlet port 5 side of an element body 23. The element hole 9 includes a twisted blade 25 in which a base end on the inlet port 3 side and a base end on the outlet port 5 side are twisted at 180°. Thus, the molding resin material flowing through the one element hole 9 is divided into two flows. The flows of the molding resin material flowing through the plurality of element holes 9 is mixed by the mixing part 21.

The plurality of (six in this case) elements 11 is arranged in parallel between the inlet port 3 and the outlet port 5, and the element body 23 has the two element holes 9. In the two element holes 9, the outer diameter is inscribed in the inner diameter of the element body 23 at equal intervals from the center of the element body 23, and the element holes 9 are arranged at intervals of 180° in the circumferential direction of the element body 23. The element holes 9, 9 provided in the adjacent elements 11, 11 are arranged while being shifted by 90° in the rotating direction where the center of the element body 23 is a rotation axis. When the element holes 9 are thus arranged, kneading efficiency of the molding resin material can be enhanced.

The mixing parts 21 are provided respectively on the inlet port 3 side and the outlet port 5 side of the element body 23 and communicated with an entrance and an exit of the element hole 9. In the mixing part 21, the flows of the molding resin material flowing through the plurality of element holes 9 (in the element 11 closest to the inlet port 3, the molding resin material introduced through the inlet port 3) converge and are mixed, and the mixed molding resin material is delivered into the plurality of element holes 9 of the element 11 located on the outlet port 5 side (in the element 11 closest to the outlet port 5, the outlet port 5).

The molding resin material repeatedly flows through the diverging part 19 and the mixing part 21 and is thereby kneaded. Since the molding resin material is divided into two by one element hole 2, when the number of elements is n, a first inflow layer (the mixing part 21 closest to the inlet port 3) is $N0$, and the number of element holes is H, the number of times N of division of the molding resin material flowing through the plurality of elements 11 is represented by the formula: $N=N0\times(2\times H)n$. Thus, in a conventional injection molding nozzle having a large pressure loss, the one element 11 has the two element holes 9, and the division number per one element is four.

Thus, in the pressure rise suppression part 13 which suppresses a rise of the injection pressure of the molding resin material introduced through the inlet port 3 of the nozzle body 7, the number of the element holes 9 in the one element 11 is set. The number of the element holes 9 in the one element 11 is set to two. In the number of the element holes 9, the kneading efficiency is enhanced with an increase in the division number, and, in addition, the pressure loss is reduced with an increase in a flow passage cross-sectional area of the molding resin material.

In the injection molding nozzle 1 according to this study example, in the pressure rise suppression part 13 a diameter D1 of the element 11 is set to not less than 2.5 times a diameter D2 of the inlet port 3.

In this injection molding nozzle 1, in the pressure rise suppression part 13 which suppresses the rise of the injection pressure of the molding resin material introduced through the inlet port 3 of the nozzle body 7, the diameter D1 of the element 11 in the one element 11 is set. The diameter D1 of the element 11 is set to not less than 2.5 times the diameter D2 of the inlet port 3. In the diameter D1 of the element 11, the flow passage cross-sectional area of the molding resin material is increased, so that the injection pressure can be made substantially equivalent to the injection pressure of an open nozzle.

In order to reduce the pressure loss of the injection pressure of the molding resin material, it is effective to reduce a length L1 of the one element 11, a land length L2 of the inlet port 3, and a land length L3 of the outlet port 5. This is because when the molding resin material flows inside the nozzle body 7, a contact distance between the molding resin material and each member is reduced, and resistance against the molding resin material is reduced. Thus, in the injection molding nozzle 1, the length L1 of the element 11, the land length L2 of the inlet port 3, and the land length L3 of the outlet port 5 are reduced to an extent to prevent lowering of kneadability.

In the injection molding nozzle 1, in the pressure rise suppression part 13 the diameter D1 of the element 11 is set to not less than 2.5 times the diameter D2 of the inlet port 3. Thus, the flow passage cross-sectional area of the element 11 can be increased when a fluid flows inside an element 105, and the pressure loss of the fluid flowing inside the nozzle body 7 can be reduced.

The injection molding nozzle according to the first study example of the present invention will be described in detail using the following Examples.

EXAMPLES

In each Example and Comparative Example 1, the number of the element holes with respect to one element is two, and the number of the elements arranged in the nozzle body is six.

Comparative Example 2 is an open nozzle in which no element is disposed between the inlet port and the outlet port.

The diameter D2 of the inlet port is 8 (mm), the diameter D1 of the element is 19 (mm) in Examples 1 to 3, 20 (mm) in Example 4, and 16 (mm) in Comparative Example 1.

The length L1 of the element is 10 (mm) in Examples 1, 2, and 4, 30 (mm) in Example 3, and 15.5 (mm) in Comparative Example 1.

The total of the land lengths L2 and L3 of the inlet port and the outlet port is 25 (mm) in Examples 1, 3, and 4, 30 (mm) in Example 2, 50 (mm) in Comparative Example 1, and 95 (mm) in Comparative Example 2.

In each Example and each Comparative Example, when an injection speed of an injection molding machine was 20, 50, or 80 (mm/sec), an injection pressure (MPa) was measured. The results are shown in a table of FIG. 3

As is clear from the table, each Example according to the present invention exhibited the injection pressure substantially equivalent to that of Comparative Example 2 as an open nozzle.

Meanwhile, Comparative Example 1 having the diameter D1 of the element that is less than 2.5 times the diameter D2 of the inlet port exhibits such a very high injection pressure that it is increased by about 60% greater than Comparative Example 2.

It is therefore found that the flow passage cross-sectional area of a fluid in the element can be increased by increasing the diameter D1 of the element, and a rise of the injection pressure can be suppressed.

Accordingly, it is found that when the diameter D1 of the element is made not less than 2.5 times the diameter D2 of the inlet port, the injection pressure can be made substantially equivalent to the injection pressure of the open nozzle, and, in addition, an injection molding nozzle which can knead a fluid sufficiently can be obtained.

From the above results, in the present invention (Examples), it is possible to obtain an injection molding nozzle which can suppress the rise of the injection pressure of the fluid introduced through the inlet port. Meanwhile, in the case of not satisfying the present invention (Comparative Examples), a less attractive injection molding nozzle is obtained.

Second Study Example

The second embodiment will be described using FIGS. 4 to 6.

In an injection molding nozzle 101 according to this embodiment, in a pressure rise suppression part 103 a length L1 (see, FIG. 1) of an element 105 is set to not less than 0.64 times and not more than 1.6 times a diameter D3 of an element hole 9.

The same components as those of the first study example are denoted by the same reference numerals, and description of their configurations and functions is omitted while referring to other embodiment. Since the second study example has the same configuration as other embodiment, the obtained effects are the same.

Figure 4:
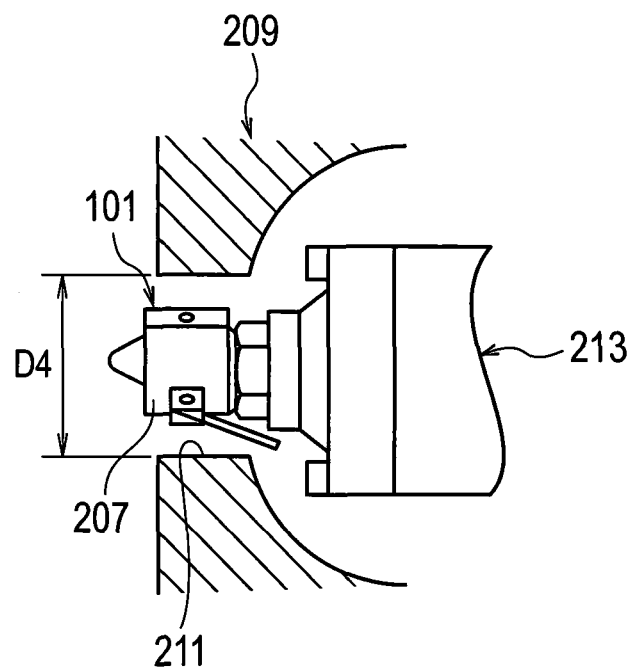
FIG. 4 is a side view of an injection molding nozzle according to a second study example.
Figure 5:
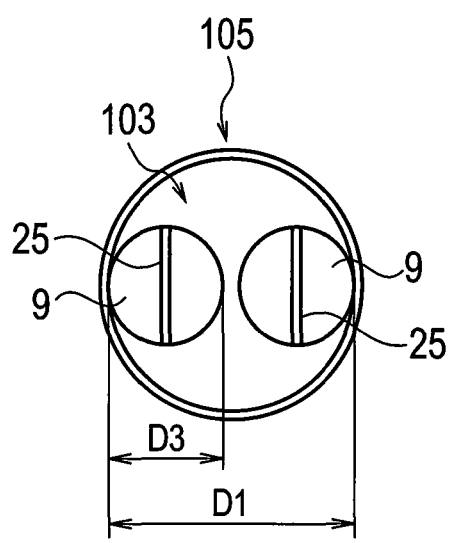
FIG. 5 is a front view of an element of the injection molding nozzle according to the second study example.

As shown in FIGS. 4 and 5, a plurality of (six in this case) the elements 105 is arranged in parallel between an inlet port 3 (see, FIG. 1) and an outlet port 5 (see, FIG. 1) in an axial direction of a nozzle body 7. The element 105 has two element holes 9. In each of the two element holes 9, the outer diameter is inscribed in the inner diameter of the element 105 at equal intervals from the center of the element 105, and the element holes 9 are arranged at intervals of 180° in the circumferential direction of the element 105. The element holes 9, 9 provided in the adjacent elements 105, 105 are arranged while being shifted by 90° in the rotating direction where the center of the element 105 is a rotation axis. The inner diameter of the element 105 is a diameter D1 of the element 105.

The injection molding nozzle 101 having the element 105 is disposed on the inner circumferential side of a locating ring insertion port 211 provided in a fixing board 209 of an injection molding machine. The locating ring insertion port 211 is disposed so that a center portion of a nozzle body 207 is positionally aligned with the central portion of the locating ring insertion port 211, and a mold member like a mold 17 (see, FIG. 1) fixed by the fixing board 209 of the injection molding machine is inserted into the locating ring insertion port 211 on the outlet port 5 side and then fixed. When the mold member is inserted into the locating ring insertion port 211, the respective center positions of the mold member and the nozzle body 207 are positionally aligned with each other, and the molding resin material injected by a cylinder 213 of the injection molding machine is kneaded through the injection molding nozzle 101 and then injected into the mold member.

Here, a generally applied injection molding machine has a size of not more than 300 tons, and, at this time, a maximum value of a diameter D4 of the locating ring insertion port 211 is 120 (mm). Thus, a maximum value of the diameter D1 of an element 203 is set to 50.5 (mm).

This is because the outer diameter of the nozzle body 207 is up to twice the diameter D1 of the element 105 (2×50.5=101 (mm)), a heater disposed on the outer circumference of the nozzle body 207 is required to have a thickness of 8 (mm), a clearance between the nozzle body 207 and the locating ring insertion port 211 is required to be 10 (mm), and the total value of all of them (101+8+10=119 (mm)) is prevented from exceeding 120 (mm) that is the maximum value of the diameter D4 of the locating ring insertion port 211.

The maximum value of the diameter D3 of the element hole 9 is set to 25 (mm) with respect to the diameter D1 of the element 105 that is 50.5 (mm). This is because the two element holes 9 are provided with respect to the element 105, and in order to secure a gap of at least 0.5 (mm) between the element holes 9, 9, 25×2+0.5=50.5 (mm).

Meanwhile, when the injection molding machine has a size of 300 tons, the maximum value of the length of the installable nozzle body 207 is 200 (mm). The nozzle body 207 accommodates the six elements 105. Thus, the maximum value of the length L1 (see, FIG. 5) per the one element 105 is set to 20 (mm), considering the inlet port 3 (see, FIG. 1), the outlet port 5 (see, FIG. 1), or other clearances, and the like.

Considering those maximum values, in the pressure rise suppression part 103 which suppresses the rise of the injection pressure of the molding resin material introduced through the inlet port 3 of the nozzle body 207, a ratio between the length L1 of the element 105 and the diameter D3 of the element hole 9 (L1/D3) is set.

More specifically, in the pressure rise suppression part 103, the length L1 of the element 105 is set to not less than 0.64 times and not more than 1.6 times the diameter D3 of the element hole 9 (L1/D3=0.64 to 1.60). The setting of the ratio between the length L1 of the element 105 and the diameter D3 of the element hole 9 (L1/D3) efficiently increases the flow passage cross-sectional area of the molding resin material in the element 105. Thus, the pressure loss of the molding resin material flowing inside the nozzle body 207 can be reduced.

In the injection molding nozzle 101, in the pressure rise suppression part 103 the length L1 of the element 105 is set to not less than 0.64 times and not more than 1.6 times the diameter D3 of the element hole 9. Thus, when a fluid flows inside the element 105, the flow passage cross-sectional area of the element 105 can be efficiently increased, and the pressure loss of the fluid flowing inside the nozzle body 207 can be reduced.

An injection molding nozzle according to the second study example of the present invention will be described in detail using the following Examples.

EXAMPLES

In each Example and each Comparative Example, the number of the element holes with respect to one element was two, and the number of the elements arranged in the nozzle body was six.

In each Example and each Comparative Example, the length L1 of the element was 16 (mm).

The diameter D3 of the element hole was 10 (mm) in Example 1, 11 (mm) in Example 2, 12 (mm) in Example 3, 13 (mm) in Example 4, 14.5 (mm) in Example 5, 15 (mm) in Example 6, 20 (mm) in Example 7, 25 (mm) in Example 8, 8 (mm) in Comparative Example 1, 9 (mm) in Comparative Example 2, and 35 (mm) in Comparative Example 3.

In each Example and each Comparative Example, PBT resin was used as a resin, and the injection pressure (MPa) per one element was measured when an injection ratio was 26.5 (cm$^3$/sec). The results are shown in a table of FIG. 6. FIG. 6 also shows a ratio between the length L1 of the element and the diameter D3 of the element hole (L1/D3) and the diameter D1 of the element.

Although Example 8 according to the present invention exhibits a very small injection pressure as in Comparative Example 3, when the element hole (the element) has the diameter in Comparative Example 3, the element hole cannot be disposed in a locating ring insertion port having a diameter D4 whose maximum value is 120 (mm), and therefore, Example 8 in which the element hole can be disposed is an upper limit of the diameter of the element hole.

Example 1 according to the present invention has a diameter of the element hole (the element), which can be disposed in the locating ring insertion port having the diameter D4 whose maximum value is not more than 120 (mm), as in Comparative Examples 1 and 2. However, in Comparative Examples 1 and 2, depending on a shape of a molded product or a resin, the injection pressure may exceed the maximum injection pressure that is a performance upper limit of an injection molding machine, and molding cannot be performed when the injection pressure is the performance upper limit of the injection molding machine. Thus, Example 1 in which the injection pressure per one element was not more than 2.9 (MPa) was defined as a lower limit value.

As is clear from above, in each Example according to the present invention, the element hole can be disposed in the locating ring insertion port, and the injection pressure was more reduced than the injection pressures in the conventional Comparative Examples 1 and 2.

Meanwhile, in each Comparative Example where the length L1 of the element is not set to not less than 0.64 times and not more than 1.6 times the diameter D3 of the element hole (L1/D3=0.64 to 1.60), in each of Comparative Examples 1 and 2 the injection pressure per one element exceeds 2.9 (MPa), and in Comparative Example 3, the element hole cannot be disposed in the locating ring insertion port.

It is, therefore, found that the setting of the length L1 of the element to not less than 0.64 times and not more than 1.6 times the diameter D3 of the element hole (L1/D3=0.64 to 1.60) can efficiently increase the flow passage cross-sectional area of the fluid in the element, and the rise of the injection pressure can be suppressed.

From the above results, in the present study example (Examples), it is possible to obtain an injection molding nozzle which can suppress the rise of the injection pressure of the fluid introduced through the inlet port. Meanwhile, in the case of not satisfying the present invention (Comparative Examples), a less attractive injection molding nozzle is obtained.

Figure 7:
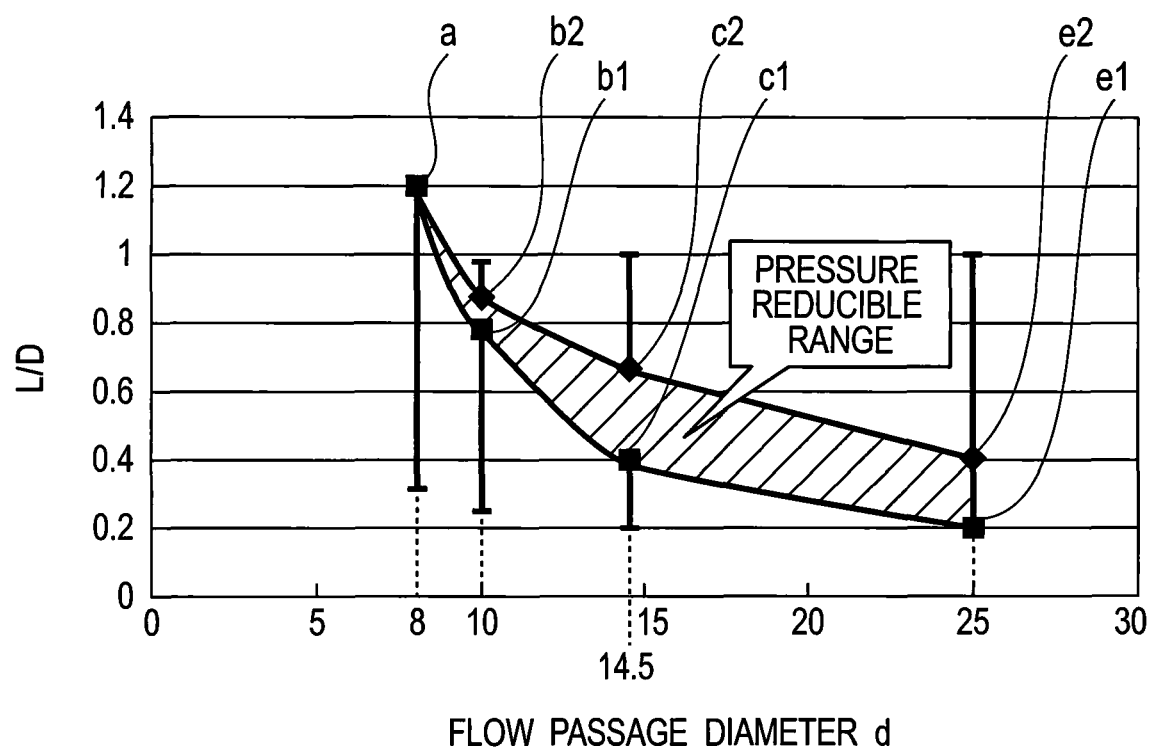
FIG. 7 is a view showing a relationship between an injection molding nozzle and a ratio between an element length and an element diameter and showing a range where the injection pressure can be reduced.
Figure 8:
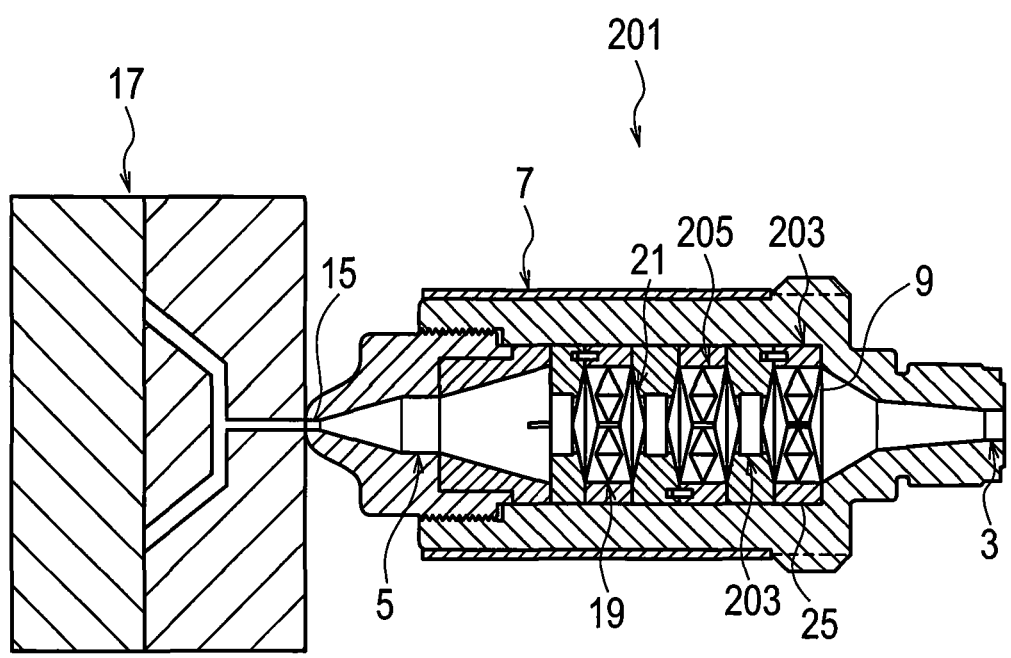
FIG. 8 is a cross-sectional view of an injection molding nozzle according to a third study example.
Figure 9:
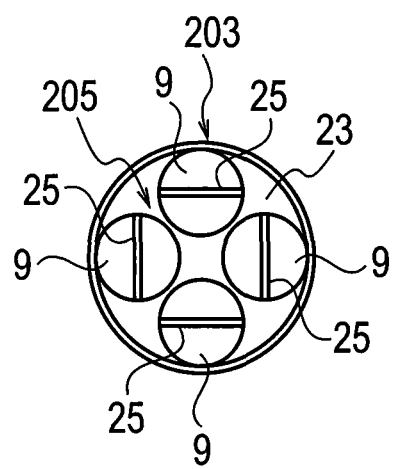
FIG. 9 is a front view of an element of the injection molding nozzle according to the third study example.

Next, with reference to FIG. 7, the injection pressure defined when the ratio L/D between the length L of the element and the diameter D of the element is changed will be described in distribution of the injection pressure defined when a flow passage diameter d of the element is a horizontal axis.

In the same drawing, a range of the ratio L/D of a flow passage diameter $\phi 8$ is 0.30 to 1.21, a range of the ratio L/D of a flow passage diameter $\phi 10$ is 0.98 to 0.24, a range of the ratio L/D of a flow passage diameter $\phi 14.5$ is 1.00 to 0.20, and a range of the ratio L/D of a flow passage diameter $\phi 25$ is 0.99 to 0.20.

Here, as a range where the injection pressure per one element satisfies not more than 2.9 MPa, in the low passage diameter $\phi 8$, the ratio L/D is 1.21 (point a), in the low passage diameter $\phi 10$, the ratio L/D is 0.78 to 0.88 (point b1 to point b2), in the low passage diameter $\phi 14.5$, the ratio L/D is 0.40 to 0.67 (point c1 to point c2), and in the low passage diameter $\phi 25$, the ratio L/D is 0.20 to 0.40 (point e1 to point e2).

Accordingly, it is found that a range where the injection pressure can be reduced is a range (a diagonal portion in FIG. 7) surrounded by the points a, b1, b2, c1, c2, e1, and e2.

Third Study Example

Next, a pressure rise suppression part 205 in which the number of element holes 9 is set to not less than three and not more than nine will be described below using FIGS. 8 to 11. This study example shows an example in which the four element holes 9 are provided. The same components as those of the first and second study examples are denoted by the same reference numerals, and description of their configurations and functions is omitted while referring to the first study example. Since the third study example has the same configuration as the first study example, the obtained effects are the same.

In the third study example, as the most preferable range of the number of the element holes 9, the four element holes 9 are provided with respect to one element 203. When the four element holes 9 are thus provided with respect to the one element 203, the injection pressure of a molding resin material introduced through an inlet port 3 is substantially equivalent to the injection pressure of a molding resin material flowing through an open nozzle. In addition, although the molding resin material cannot be sufficiently kneaded in the open nozzle, an injection molding nozzle 1 in which the elements 203 are arranged can sufficiently knead the molding resin material.

In each of the four element holes 9, the outer diameter is inscribed in the inner diameter of an element body 23 at equal intervals from the center of the element body 23, and the element holes 9 are arranged at equal intervals in the circumferential direction of the element body 23. The element holes 9, 9 of the adjacent elements 203, 203 are arranged while being shifted by 45° in the rotating direction where the center of the element body 23 is a rotation axis. Such arrangement of the element holes 9 can enhance kneading efficiency of the molding resin material.

The injection molding nozzle 1 has, in the nozzle body 7, the pressure rise suppression part 205 which suppresses the rise of the injection pressure of a fluid introduced through the inlet port 3. Thus, the rise of the injection pressure of the fluid introduced through the inlet port 3 can be suppressed by the pressure rise suppression part 205, so that the pressure loss of the fluid flowing inside the nozzle body 7 can be reduced.

Accordingly, in the injection molding nozzle 201, since the rise of the injection pressure can be suppressed by the pressure rise suppression part 205, an increase in the size of an injection molding machine can be suppressed.

In the pressure rise suppression part 205, the number of the element holes 9 is set to not less than three and not more than nine. Thus, the number of times of division of a fluid flowing through the elements 203 can be increased, and the kneading efficiency of the fluid can be enhanced. In addition, the flow passage cross-sectional area of the element 203 can be increased when the fluid flows inside the element 203, and the pressure loss of the fluid flowing inside the nozzle body 7 can be reduced.

The pressure rise suppression part 205 makes the injection pressure of a fluid, introduced through the inlet port 3 to pass through the plurality of elements 203, and, thus, to flow through the outlet port 5, substantially equivalent to the injection pressure of a fluid introduced through the inlet port 3 and directly flowing through the outlet port 5. Thus, the pressure rise suppression part 205 can makes the pressure loss substantially equivalent to the pressure loss of an open nozzle in which the plurality of elements 203 is not provided in the nozzle body 7. In addition, although the pressure loss is substantially equivalent to the pressure loss of the open nozzle, the fluid can be kneaded in the nozzle body 7.

In the pressure rise suppression part 205, the number of the element holes 9 is set to four. Thus, while the number of times of division of the fluid defined when the fluid flows through the element 203 is increased, the flow passage cross-sectional area of the element 203 is increased, whereby the pressure loss can be made substantially equivalent to the pressure loss of the open nozzle.

The injection molding nozzle according to the third study example of the present invention will be described in detail using the following Examples.

EXAMPLES

The number of the element holes with respect to one element was from three to nine in each Example 1, two in Comparative Example 1, and ten in Comparative Example 2. In each of the element holes, the outer diameter is inscribed in the inner diameter of the element at equal intervals from the center of the element, and the element holes are arranged at equal intervals in the circumferential direction of the element.

In each Example and Comparative Examples 1 and 2, the number of the elements arranged in the nozzle body was 6.

In Comparative Example 3, no element is disposed between an inlet port and an outlet port, and Comparative Example 3 is an open nozzle whose diameter from the inlet port to the outlet port is constant. Thus, the flow passage cross-sectional area in Comparative Example 3 has a smaller value than other Examples and Comparative Examples.

In each Example and each Comparative Example, the injection pressure (MPa) defined when the injection speed of an injection molding machine was 20, 50, or 80 (mm/sec) was measured.

Figures 10, 11:
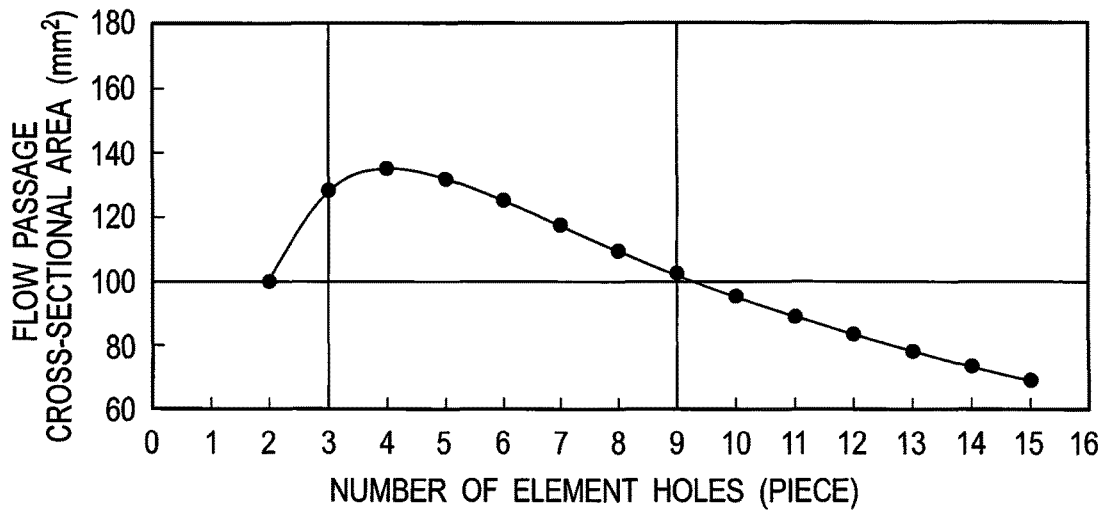
FIG. 10 is a graph showing the injection pressures in Examples and Comparative Examples in the injection molding nozzle according to the third study example.
FIG. 11 is a view showing a relationship between the number of element holes and a flow passage cross-sectional area in Examples and Comparative Examples in the injection molding nozzle according to the third study example.
Figure 15:
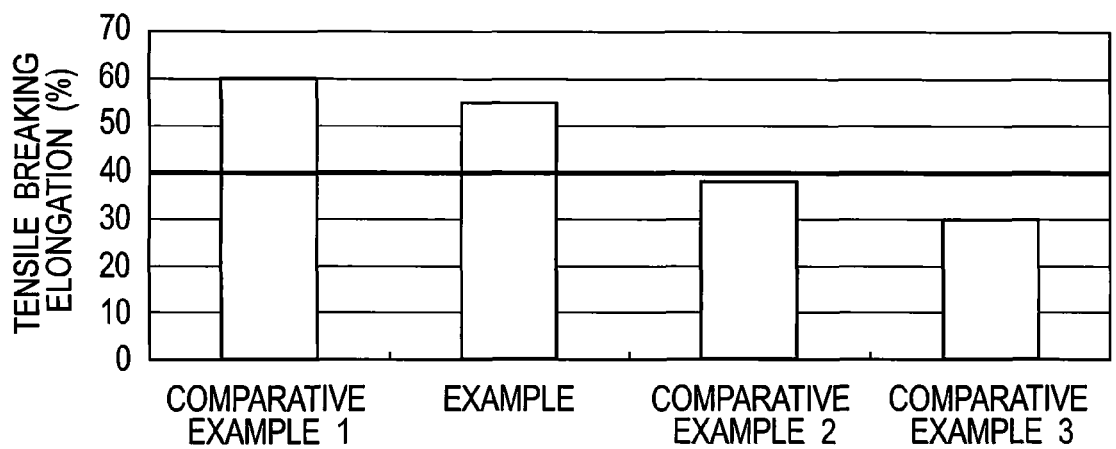
FIG. 15 is a view showing tensile breaking elongation of Examples and Comparative Examples when the resin of another example is used in the natural pellets of the automotive injection-molded product according to the embodiment of the present invention.
Figure 16:
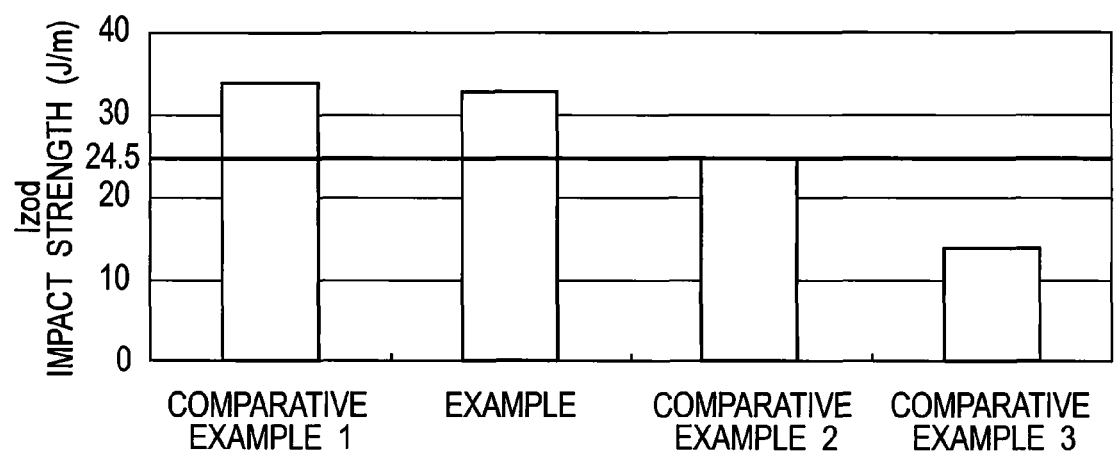
FIG. 16 is a view showing Izod impact strength of Examples and Comparative Examples when the resin of another example is used in the natural pellets of the automotive injection-molded product according to the embodiment of the present invention.
Figures 17, 18:
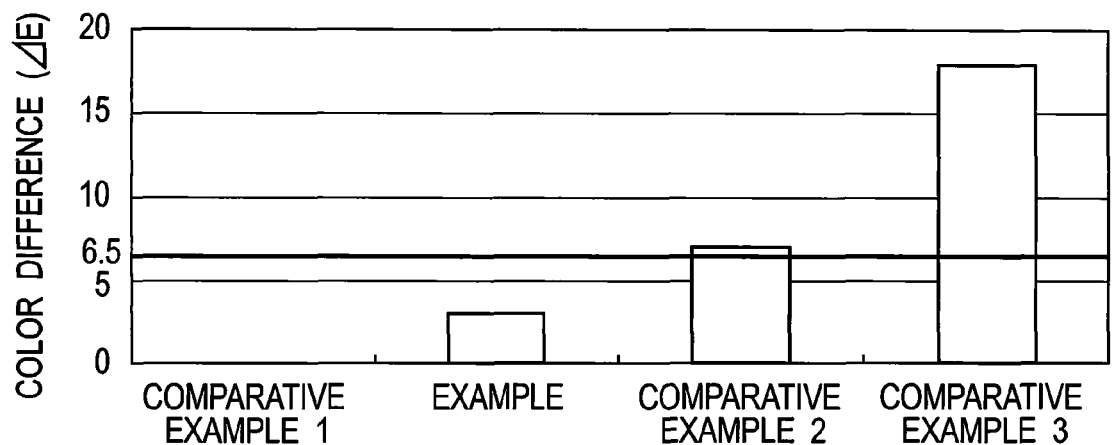
FIG. 17 is a view showing a color difference of Examples and Comparative Examples when the resin of another example is used in the natural pellets of the automotive injection-molded product according to the embodiment of the present invention.
FIG. 18 is a graph showing determination results of Examples and Comparative Examples when the resin of another example is used in the natural pellets of the automotive injection-molded product according to the embodiment of the present invention.

The results are shown in a table 10. The table of FIG. 10 shows the flow passage cross-sectional area of a fluid and the number of times of division of the fluid in each Example and each Comparative Example. FIG. 11 shows a relationship between the element hole and the flow passage cross-sectional area.

As is clear from the table and FIG. 11, in each Example according to the present invention, the injection pressure was more reduced than the conventional Comparative Example 1 having two element holes per one element.

Meanwhile, in Comparative Example 2 having ten element holes per one element, the injection pressure was more increased than Comparative Example 1.

Example 2 having the four element holes per one element exhibited the injection pressure substantially equivalent to the injection pressure of Comparative Example 3 as an open nozzle.

The division numbers not less than 46656 (times) in each Example of the present invention (a minimum number of the element holes: 3, the number of the elements: 6) are about 11 times the division number of in Comparative Example 1 (the number of the elements holes: 2, the number of the elements: 6) that is 4096 (times), and in the injection molding nozzle according to each Example of this invention, the kneadability that is about 11 times that of a conventional injection molding nozzles can be at least obtained. In addition, the flow passage cross-sectional area not less than 103.8 (mm$^2$) in each Example of this invention is larger than the flow passage cross-sectional area in Comparative Example 1 that is 100.5 (mm$^2$).

It is, therefore, found that an increase in the number of element holes per one element can increase the division number, and the kneadability can be enhanced.

However, when ten or more element holes are provided per one element, the flow passage cross-sectional area is reduced, and this causes an increase in the injection pressure, so that the injection pressure cannot be reduced.

Accordingly, when not less than three and not more than nine element holes are provided per one element, it is found that it is possible to obtain an injection molding nozzle which can have more enhanced kneadability and a more reduced injection pressure than those of a conventional injection molding nozzle having two element holes per one element. In addition, when four element holes are provided per one element, it is found that it is possible to obtain an injection molding nozzle which can exhibit the injection pressure that can be made substantially equivalent to the injection pressure of an open nozzle.

From the above results, in the present invention (Examples), it is possible to obtain an injection molding nozzle which can suppress the rise of the injection pressure of a fluid introduced through an inlet port. Meanwhile, in the case of not satisfying the present invention (Comparative Examples), a less attractive injection molding nozzle is obtained.

REFERENCE EXAMPLE

As a reference example showing a relationship between a length in an injection molding nozzle and the pressure loss per one element, a change in the pressure loss due to an element length is shown in a table of FIG. 12. Further, a change in the pressure loss due to land lengths of an inlet port and an outlet port is shown in a table of FIG. 13.

In the table of FIG. 12, a diameter of an element is a radius, the element lengths in element diameters of 10, 16, 20, 30, and 40 (mm) are changed respectively to 5, 10, 15.5, and 20 (mm), and the pressure loss (MPa) per one element defined when the injection speed is 20, 50, or 80 (mm/sec) are shown in the table.

As is clear from the table, the longer the element length, the higher the pressure loss. It is, therefore, found that when the element length is reduced, resistance of a fluid is reduced, so that the injection pressure can be reduced.

In the table of FIG. 13, a total of the land lengths of the inlet port and the outlet port is changed to 10, 15, 20, 25, 30, 35, 40, and 45 (mm), and the pressure loss (MPa) per one element defined when the injection speed is 20, 50, or 80 (mm/sec) are shown in the table.

As is clear from the table, the longer the land length, the higher the pressure loss. It is, therefore, found that when the land length is reduced, resistance of a fluid is reduced, so that the injection pressure can be reduced.

From the above results, the resistance of a fluid flowing inside a nozzle body can be reduced by reducing the element length and the land lengths of the inlet port and the outlet port, and it is possible to obtain an injection molding nozzle which can suppress the rise of the injection pressure of the fluid introduced through the inlet port.

In the injection molding nozzle according to the second study example of the present invention, although the diameter of the element is set to not less than 2.5 times the diameter of the inlet port, this value shows a lower limit, and its upper limit depends on the nozzle body accommodating the element. Thus, the diameter of the nozzle body is set to a size capable of accommodating the element whose diameter is set to at least not less than 2.5 times the diameter of the inlet port.

An automotive injection-molded product according to the embodiment of the present invention which is molded using the injection molding nozzle studied as above will be described below using FIGS. 14 to 20.

The automotive injection-molded product according to the embodiment is constituted of natural pellets and masterbatches that color the natural pellets.

In the automotive injection-molded product, a color difference between a high concentration portion and a low concentration portion of the masterbatches with respect to the natural pellets in a flat plate is not more than 6.5.

The automotive injection-molded product has a material physical property substantially equivalent to that of colored pellets.

Here, in FIGS. 14 to 20, the automotive injection-molded product according to the embodiment which is molded using the injection molding nozzle shown in the above study examples is described as Example, the colored pellets are described as Comparative Example 1, an injection-molded product molded using a conventional injection molding nozzle is described as Comparative Example 2, and an injection-molded product molded using an open nozzle is described as Comparative Example 3.

Hereinafter, setting of the injection molding nozzles used in this Example and the respective Comparative Examples, natural pellets, masterbatches, colored pellets, measurement conditions, and determination conditions will be described.

As the natural pellets, 1401X06 manufactured by Toray Industries, Inc. as PBT resin was used.

As the masterbatches, 25 times diluted Standard Eight manufactured by Sanyo Kako Co., Ltd. as blue color for PBT resin was used.

As the colored pellets, 1401X06 manufactured by Toray Industries, Inc. as blue color for PBT resin was used.

In a tensile test, a shape of a test piece to be used was ASTM #4 in accordance with ASTM D638.

In an Izod impact test, a test piece to be used had a shape of a thickness of 3.2 (mm)×a width of 12.5 (mm)×a length of 63.5 (mm) in accordance with ASTM D256.

A test piece to be used in a color measurement test has a flat plate shape of 81.2 (mm)×81.2 (mm)×2 (mm). Color measurement conditions include a 45-0 degree system, a light source D65, and a 10 degree field of view. The high concentration portion (where no color unevenness occurs) and the low concentration portion (where color unevenness occurs) of the masterbatches with respect to the natural pellets in the flat plate were subjected to color measurement, and the color difference was calculated.

In determination criteria in the tensile test, when 1401X06 manufactured by Toray Industries, Inc. as the PBT resin was used in the natural pellets, it was approved when the result showed tensile breaking elongation of not less than 40(%).

In determination criteria in the Izod impact test, when 1401X06 manufactured by Toray Industries, Inc. as the PBT resin was used in the natural pellets, it was approved when the result showed Izod impact strength of not less than 24.5 (J/m).

In determination criteria in the color measurement test, since a range that can be handled as the same colors at an impression level, an allowable color difference generally handled in color management, and a B-grade allowable difference regarded as an allowable range of colors that are regarded as equal colors when different in a color material and a material texture were from 3.2 to 6.5, it was approved when the result showed the color difference of not more than 6.5.

FIGS. 14 to 18 show the results obtained when 1401X06 manufactured by Toray Industries, Inc. as the PBT resin was used in the natural pellets.

As seen in FIGS. 14 to 18, in each Example as the automotive injection-molded product according to this embodiment, the color difference was not more than 6.5. In addition, each Example had the tensile breaking elongation and the Izod impact strength substantially equivalent to those of Comparative Example 1 as colored pellets.

Meanwhile, in Comparative Example 2 as an injection-molded product molded using a conventional injection molding nozzle and Comparative Example 3 as an injection-molded product molded using an open nozzle, each color difference was more than 6.5.

From the above results, in the automotive injection-molded product according to this embodiment, the color difference between the high concentration portion and the low concentration portion of the masterbatches with respect to the natural pellets in the flat plate is not more than 6.5, and therefore color unevenness is unnoticeable.

Since the automotive injection-molded product according to this embodiment has a material physical property substantially equivalent to that of colored pellets. Thus, the color unevenness is unnoticeable, and the material physical property is not lowered.

Figure 19:
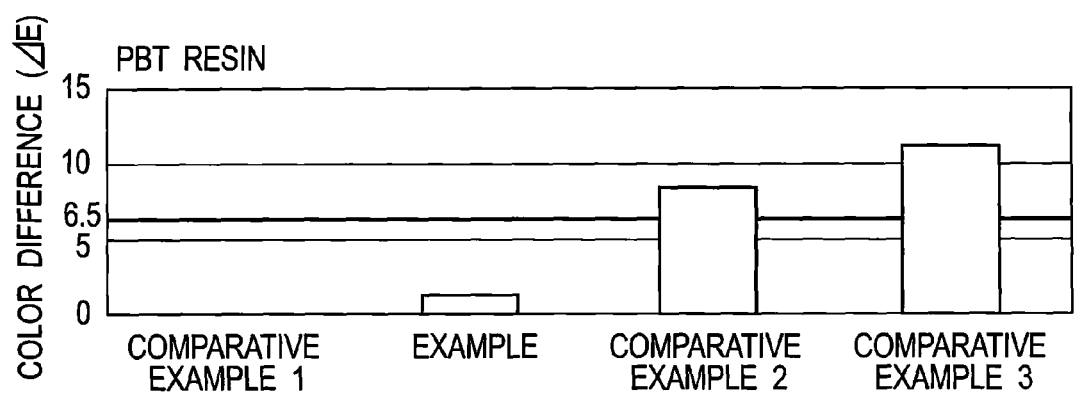
FIG. 19 is a view showing the color difference of Examples and Comparative Examples in PBT resin of a reference example.
Figure 20:
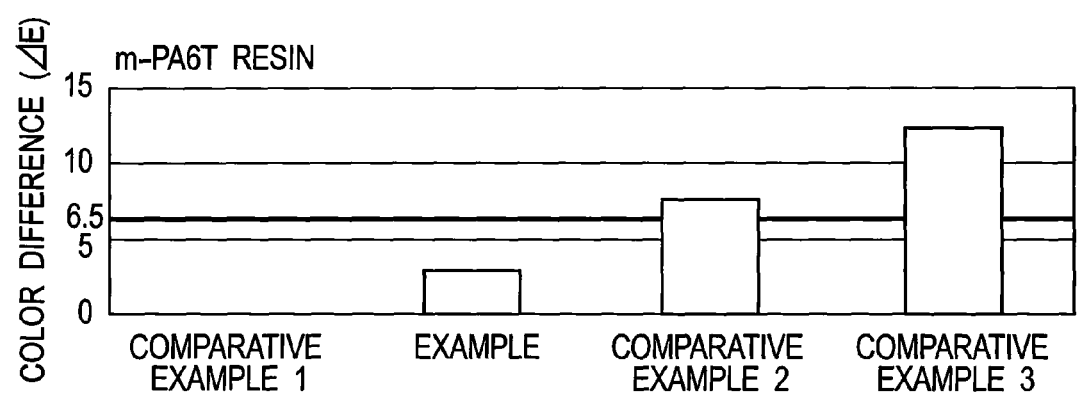
FIG. 20 is a view showing the color difference of Examples and Comparative Examples in an m-PA6T resin of a reference example.

As reference examples, measurement results of the color differences obtained when PBT resin, m-PA6T, PA6, and PP are used as natural pellets are shown in FIGS. 19 and 20.

As is clear from FIGS. 19 and 20, in all the resins, the color difference in each Example was not more than 6.5.

Meanwhile, in PA6 and PP, the color difference in Comparative Example 2 was not more than 6.5, and in PP, the color difference in Comparative Example 3 was not more than 6.5.

It is, therefore, found that depending on a material to be used, even if a conventional injection molding nozzle or an open nozzle is used, an injection-molded product whose color difference is not more than 6.5 can be obtained.

Examples of automotive injection-molded products include a connector, a protector, J/B, and R/B.

In this way, the present invention includes various embodiments not described above. Therefore, the scope of the present invention is determined only by the invention identification matters according to claims reasonable from the foregoing description.

What is claimed is:

1. An injection-molded product formed by using:
   a nozzle having a nozzle body, an inlet port through which a fluid is introduced, an outlet port through which the fluid is delivered, and a plurality of elements positioned between the inlet port and the outlet port;
   natural pellets; and
   masterbatches that color the natural pellets,
   wherein, the nozzle is configured such that in a condition where the fluid formed from the natural pellets and the masterbatches is applied to the inlet port of the nozzle, fluid is kneaded by the plurality of elements and a rise of an injection pressure of the fluid is suppressed,
   wherein, in a color measurement test using a test piece of the injection-molded product in a flat plate shape, a color difference between a first concentration portion and a second concentration portion of the masterbatches with respect to the natural pellets in the test piece of the injection-molded product is not more than 6.5,
   wherein, in a tensile test in accordance with ASTM D638 using a test piece of the injection-molded product in a shape of ASTM #4, a tensile breaking elongation of the test piece of the injection-molded product is not less than 40%, and
   wherein, in an Izod impact test in accordance with ASTM D256, an Izod impact strength of a test piece of the injection-molded product in a shape of a thickness of 3.2 mm*a width of 12.5 mm*a length of 63.5 mm is not less than 24.5 J/m.

2. The injection-molded product according to claim 1, wherein,
   in the color measurement test, the test piece in a flat plate shape has dimension of 81.2 mm*81.2 mm*2 mm, and color measurement conditions include a 45-0 degree system, a light source D65, and a 10 degree field of view.

3. The injection-molded product according to claim 1, wherein
   the plurality of elements comprise a plurality of element holes, and
   the nozzle is configured such that the plurality of elements knead the fluid which is introduced into the nozzle body at the inlet port by introducing the fluid through the plurality of element holes.

4. The injection-molded product according to claim 1, wherein the nozzle body comprises a pressure rise suppression part to suppress the rise of the injection pressure of the fluid introduced through the inlet port.

5. The injection-molded product according to claim 4, wherein the pressure rise suppression part causes the fluid introduced through the inlet port to pass through the plurality of elements.

6. The injection-molded product according to claim 1, wherein
   each of plurality of elements comprises an element body, a diverging part and a mixing part,
   the diverging part comprises a plurality of element holes communicated from an inlet port side of the element body to an outlet port side of the element body.

7. The injection-molded product according to claim 6, wherein each element hole comprises a twisted blade in which a base end on the inlet port side and a base end on the outlet port side are twisted at 180 degrees such that the fluid flowing through each element hole is divided into two flows, and the two divided flows are mixed by the mixing part.

8. The injection-molded product according to claim 6, wherein each element body has two element holes, an outer diameter of each element hole is inscribed in an inner diameter of the element body at equal intervals from the center of the element body, and the two element holes are arranged at intervals of 180 degrees in a circumferential direction of the element body.

9. The injection-molded product according to claim 8, wherein the two element holes provided in each of adjacent ones of elements are arranged shifted by 90 degree in a rotating direction where a center of the element body is a rotation axis.

10. The injection-molded product according to claim 6, wherein a number of the plurality of element holes is set to not less than three and not more than nine.

11. The injection-molded product according to claim 6, wherein the plurality of element holes are arranged at equal intervals in the circumferential direction of the element body.

12. The injection-molded product according to claim 1, wherein a length of each of the plurality of elements, a land length of the inlet port, and a land length of the outlet port are reduced to prevent lowering of kneadability.

13. The injection-molded product according to claim 1, wherein, for an injection pressure of not more than 2.9 MPa, a range of a ratio between a length of each of the plurality of elements and a diameter of each of the plurality of elements for a flow passage diameter of $\phi 8$ is 0.30 to 1.21.

14. The injection-molded product according to claim 1, wherein, for an injection pressure of not more than 2.9 MPa, a range of a ratio between a length of each of the plurality of elements and a diameter of each of the plurality of elements for a flow passage diameter of $\phi 10$ is 0.98 to 0.24.

15. The injection-molded product according to claim 1, wherein, for an injection pressure of not more than 2.9 MPa, a range of a ratio between a length of each of the plurality of elements and a diameter of each of the plurality of elements for a flow passage diameter of $\phi 14.5$ is 1.00 to 0.20.

16. The injection-molded product according to claim 1, wherein a range of a ratio between a length of each of the plurality of elements and a diameter of each of the plurality of elements for a flow passage diameter of $\phi 25$ is 0.99 to 0.20.

* * * * *